No. 805,835. PATENTED NOV. 28, 1905.
R. BAGGALEY.
FLUXING COPPER ORES.
APPLICATION FILED MAR. 3, 1904.
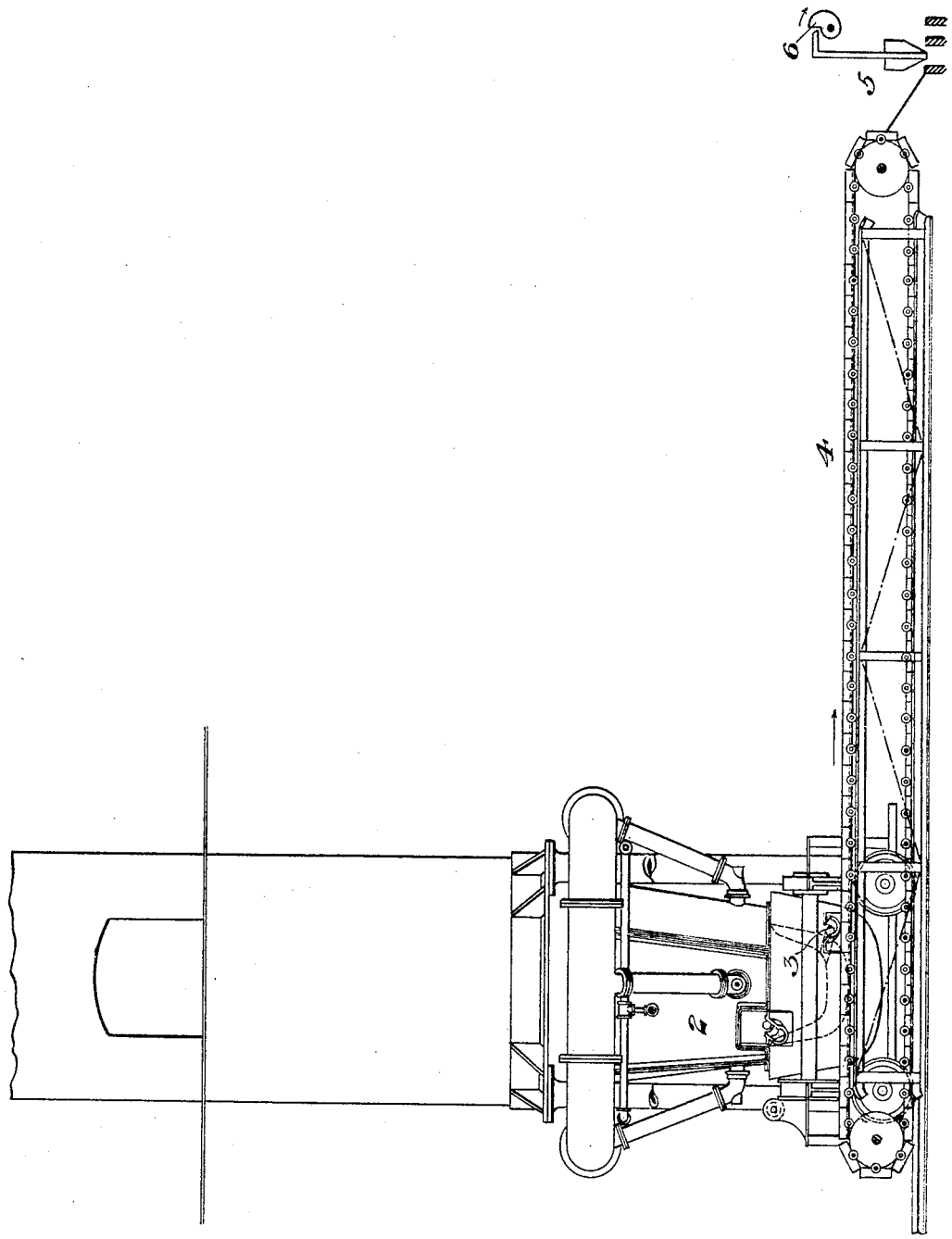
WITNESSES
INVENTOR
Ralph Baggaley
by his attorneys
Bakewell & Byrnes

UNITED STATES PATENT OFFICE.

RALPH BAGGALEY, OF PITTSBURG, PENNSYLVANIA.

FLUXING COPPER ORES.

No. 805,835.  Specification of Letters Patent.  Patented Nov. 28, 1905.

Application filed March 3, 1904. Serial No. 196,259.

*To all whom it may concern:*

Be it known that I, RALPH BAGGALEY, of Pittsburg, Allegheny county, Pennsylvania, have invented a new and useful Method of Fluxing Copper Ores, of which the following is a full, clear, and exact description, reference being had to the accompanying drawing, forming part of this specification, which shows in side elevation apparatus suitable for the practice of my invention.

According to my invention a metallic iron flux is used in smelting ores, and particularly copper ores, in lieu of oxidized iron ores such as are now ordinarily utilized for this purpose.

It is well known by those conversant with the art of recovering the contained values from copper, gold, and silver ores by any of the various forms of smelting that oxidized-iron fluxes are expensive and difficult to obtain in an adequate supply. In many mineral districts vast and valuable bodies of ore, though well known to exist for years past, are neglected because such districts are devoid of iron fluxes and have no railroad facilities for bringing fluxes to the place of mining the ores or transporting the ores themselves to suitable points for smelting. In Montana, where the scarcity of iron flux is universal, oxidized-iron outcrops command high prices and are very difficult to obtain in sufficient volume to satisfy the present demands of the smelters. For this reason various expedients are resorted to and bad and wasteful smelter practice often prevails. Excessive proportions of lime are generally used as a substitute for iron flux. In the purchase of oxidized-iron flux of course an effort is made to procure such as contain values. As a rule copper values are absent, because the oxidation of the iron also converts the copper sulfid into copper sulfate, which being soluble in water is washed away by the action of the waters. Silver values are also in the same manner rendered transitory. Hence the remaining values, if any, usually consist of gold. It is seldom, however, that these exceed from three to five dollars per ton. In purchasing oxidized-iron ores the smelter is compelled to pay for ninety per cent. of the contained values, together with a liberal price for the oxidized iron, the latter usually amounting to four dollars and fifty cents to five dollars and fifty cents per ton in addition to the contained mineral values, as before stated. In the present practice this iron is used as a flux in combination with the ores under treatment and all the mineral values contained in the ores and flux are recovered as far as the present imperfect treatment process will admit. The slag produced by this operation is then usually regarded as a worthless product, and it is thrown upon the slag-dump as being unworthy of further consideration. Such slag never contains less than sixteen per cent. of metallic iron. It usually contains from thirty-five to forty-five per cent. and it may at times contain fifty-five per cent. Such slags also contain not less than four-tenths of one per cent. of copper, usually from three-quarters to one per cent. and often one and a quarter per cent. even in the Butte district, where smelter practice is considered good.

In a patent application filed by me on December 23, 1903, Serial No. 186,336, I have described a method of separating the iron from ferruginous slags for use either as cast-iron or in the production of steel. In practicing the art described in that invention I have also successfully separated with the iron the copper, gold, and silver that happened to exist in the slags under treatment. It will be noted by those skilled in the art when a slag containing one-half per cent. of copper, forty-nine and one-half per cent. iron, and fifty per cent. silica, alumina, lime, and other bases is treated for a complete separation of the contained metals, as described in my said application, the resulting metals will consist of ninety-nine per cent. of iron and one per cent. copper. Slags from copper-smelting furnaces, however, very rarely contain so high a percentage of iron as that stated in ordinary smelter practice. An illustration of the slags resulting from ordinary practice, particularly in the Butte district, would be more nearly two-thirds of a per cent. of copper, thirty-three and one-third per cent. of iron, and sixty-six per cent. of silica, alumina, sulfur, and other elements combined. When the metals, therefore, have been separated, as contemplated in the application above referred to, the resulting metals would consist of approximately ninety-eight per cent. of iron and two per cent. of copper, or, in other words, say, forty pounds of copper to the ton of iron thus produced, or approximately four dollars' worth of copper per ton. When slag containing nine-tenths per cent. of copper, sixteen per cent. of iron, twenty-three per cent. of lime, and approximately sixty per cent. of silica, alumina, sulfur, and other elements is utilized in practicing the process described in my application, Serial No. 186,336, it will be apparent that when the contained metals have been separated from the bases they will consist approximately of ninety-four and one-half per cent. of iron and five and one-half per cent. of copper, or, say, one hundred and ten pounds of copper to the ton of iron thus produced. In other words, such slags when reduced to metal by my improved process would contain eleven dollars' worth of copper to the ton of iron, together with any gold or silver that might be associated therewith. In addition to these values must be considered the value of the metallic iron itself as a fluxing agent. The oxidized-iron ores as now purchased never contain over fifty per cent. of FeO, and they rarely contain in excess of five dollars per ton in mineral values, the latter usually being in the form of free gold.

Metallic iron, if reduced to suitable form for use as a fluxing agent on the lines of my present invention, will yield double the efficiency of oxidized ores, as they are now utilized for the purpose, that contain fifty per cent. FeO. For these reasons metallic-iron flux in suitable form is worth as a fluxing agent at least twice as much as the ordinary oxidized-iron fluxes. Metallic-iron flux will not be available for use as such when cast in the form of pigs, as described in my application, Serial No. 186,336, because such pig, even when broken into pieces by reason of its great weight, would rapidly sink through the charge past the zone of fusion in the blast-furnace and into the crucible below, thus failing in its mission as a flux and at the same time breaking holes through the charge past the zone of fusion, and thus retarding and seriously interfering with the smelting process. In order, therefore, to produce the metallic-iron flux in the most available and desirable form, I preferably use the apparatus shown in the drawings hereto attached, in which the metal in molten form is tapped from the separating-furnace 2, and thus flows from a suitable spout 3 onto a traveling trough conveyer 4, that is preferably inclined. In this manner the molten metal automatically spreads itself while in the molten condition into thin sheets or plates over the entire area of the inclined metal trough, and in this form it quickly solidifies. The solid trough conveyer is made long enough by me to permit the molten metal to thus solidify before it is discharged from the conveyer. At the end of the conveyer I utilize any desired form of apparatus or device that will have the effect of breaking up these thin metal sheets into comparatively small pieces. This work will be facilitated by a shock, such as that delivered by a hammer or a falling weight rather than by pressure. The latter will accomplish the result; but it demands the use of unnecessary power. The best device for the purpose is the simple form of drop-hammer 5, operated by cam 6, shown in the drawing, which will accomplish the result with the expenditure of a very small amount of power.

By delivering the molten metal from the separating-furnace into a suitable receptacle containing water the metallic-iron flux may be converted into granular form, in which it can be utilized in the blast-furnace as a metallic flux, either direct or when briqueted in suitable machinery or when combined with some bonding agent and utilized in the form of bricks or plates. The use of this metallic-iron flux in the granulated form, however, is not desirable and will involve an increased expense for briqueting or forming through the medium of some bonding agent into bricks or plates. All things considered, its most desirable form for use as a fluxing agent is when it has been broken into pieces, as above described.

Many variations of the process herein described in this invention will naturally suggest themselves to those skilled in the art without departing from the spirit of my invention, since

What I claim is—

1. The method herein described which consists in charging into a copper-smelting blast-furnace metallic iron as a flux; substantially as described.

2. The method herein described which consists in charging into a copper-smelting blast-furnace metallic iron in divided form as a flux; substantially as described.

In testimony whereof I have hereunto set my hand.

RALPH BAGGALEY.

Witnesses:
WILLIAM M. KIRKPATRICK,
IRVING MACDONALD.